US008373367B2

(12) United States Patent
Yoshida et al.

(10) Patent No.: US 8,373,367 B2
(45) Date of Patent: Feb. 12, 2013

(54) DYNAMO-ELECTRIC MACHINE CONTROL SYSTEM AND VEHICLE DRIVING SYSTEM INCLUDING THE SAME

(75) Inventors: Takashi Yoshida, Anjo (JP); Subrata Saha, Anjo (JP); Daisuke Ogino, Anjo (JP); Jin Izawa, Obu (JP); Kazuo Aoki, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 678 days.

(21) Appl. No.: 12/458,146

(22) Filed: Jul. 1, 2009

(65) Prior Publication Data

US 2010/0026222 A1 Feb. 4, 2010

(30) Foreign Application Priority Data

Jul. 31, 2008 (JP) ................................ 2008-198109

(51) Int. Cl.
*H02P 1/00* (2006.01)

(52) U.S. Cl. .................... 318/139; 318/400.23; 318/800

(58) Field of Classification Search ............. 318/400.23, 318/139, 430, 432, 434, 800; 180/65.3
See application file for complete search history.

(56) References Cited

U.S. PATENT DOCUMENTS

| | | | | |
|---|---|---|---|---|
| 5,808,428 | A * | 9/1998 | Ito et al. | 318/139 |
| 7,133,602 | B2 * | 11/2006 | Yamada | 388/806 |
| 7,200,476 | B2 | 4/2007 | Cawthorne et al. | |
| 7,834,578 | B2 * | 11/2010 | Sato | 318/800 |
| 8,112,192 | B2 * | 2/2012 | Heap et al. | 701/22 |
| 2002/0024221 | A1 | 2/2002 | Grewe et al. | |
| 2003/0052650 | A1 | 3/2003 | Gunji | |
| 2004/0065489 | A1 | 4/2004 | Aberle et al. | |
| 2006/0021809 | A1 | 2/2006 | Xu et al. | |
| 2006/0086981 | A1 * | 4/2006 | Yamaguchi et al. | 257/347 |
| 2007/0158121 | A1 * | 7/2007 | Sato | 180/65.3 |
| 2008/0186751 | A1 * | 8/2008 | Tokuyama et al. | 363/131 |
| 2008/0265809 | A1 * | 10/2008 | Ol et al. | 318/139 |

(Continued)

FOREIGN PATENT DOCUMENTS

| | | |
|---|---|---|
| DE | 102 23 117 A1 | 12/2003 |
| JP | A-9-23512 | 1/1997 |

(Continued)

OTHER PUBLICATIONS

Nov. 28, 2012 Office Action issued in German Patent Application No. DE112009000114.9 (English Translation only).

*Primary Examiner* — Paul Ip
(74) *Attorney, Agent, or Firm* — Oliff & Berridge, PLC

(57) ABSTRACT

A dynamo-electric machine control system including a dynamo-electric machine and an inverter that is interposed between a battery and the dynamo-electric machine and that controls a current flowing through the dynamo-electric machine, wherein a rotation speed and an output torque of the dynamo-electric machine are controlled by the inverter, the dynamo-electric machine control system includes a battery power deriving unit that derives a battery power to be supplied from the battery when the dynamo-electric machine is operated at the rotation speed and the output torque; a limit power determining unit that variably determines a limit power, which is a maximum allowable value of the battery power, in accordance with a battery voltage; and a torque limiting unit that limits the torque of the dynamo-electric machine such that the battery power derived by the battery power deriving unit does not exceed the limit power.

8 Claims, 8 Drawing Sheets

U.S. PATENT DOCUMENTS

| | | | | |
|---|---|---|---|---|
| 2008/0283313 | A1* | 11/2008 | Ojima et al. | 180/65.3 |
| 2009/0118080 | A1* | 5/2009 | Heap et al. | 477/3 |
| 2010/0175944 | A1* | 7/2010 | Hayashi | 180/242 |
| 2010/0201293 | A1* | 8/2010 | Yoshida et al. | 318/139 |
| 2010/0207559 | A1* | 8/2010 | Imai | 318/400.23 |
| 2011/0166730 | A1* | 7/2011 | Wang et al. | 701/22 |

FOREIGN PATENT DOCUMENTS

| | | |
|---|---|---|
| JP | A-9-312901 | 12/1997 |
| JP | A-2005-210779 | 8/2005 |
| JP | A-2005-218250 | 8/2005 |
| JP | A-2006-211789 | 8/2006 |

* cited by examiner

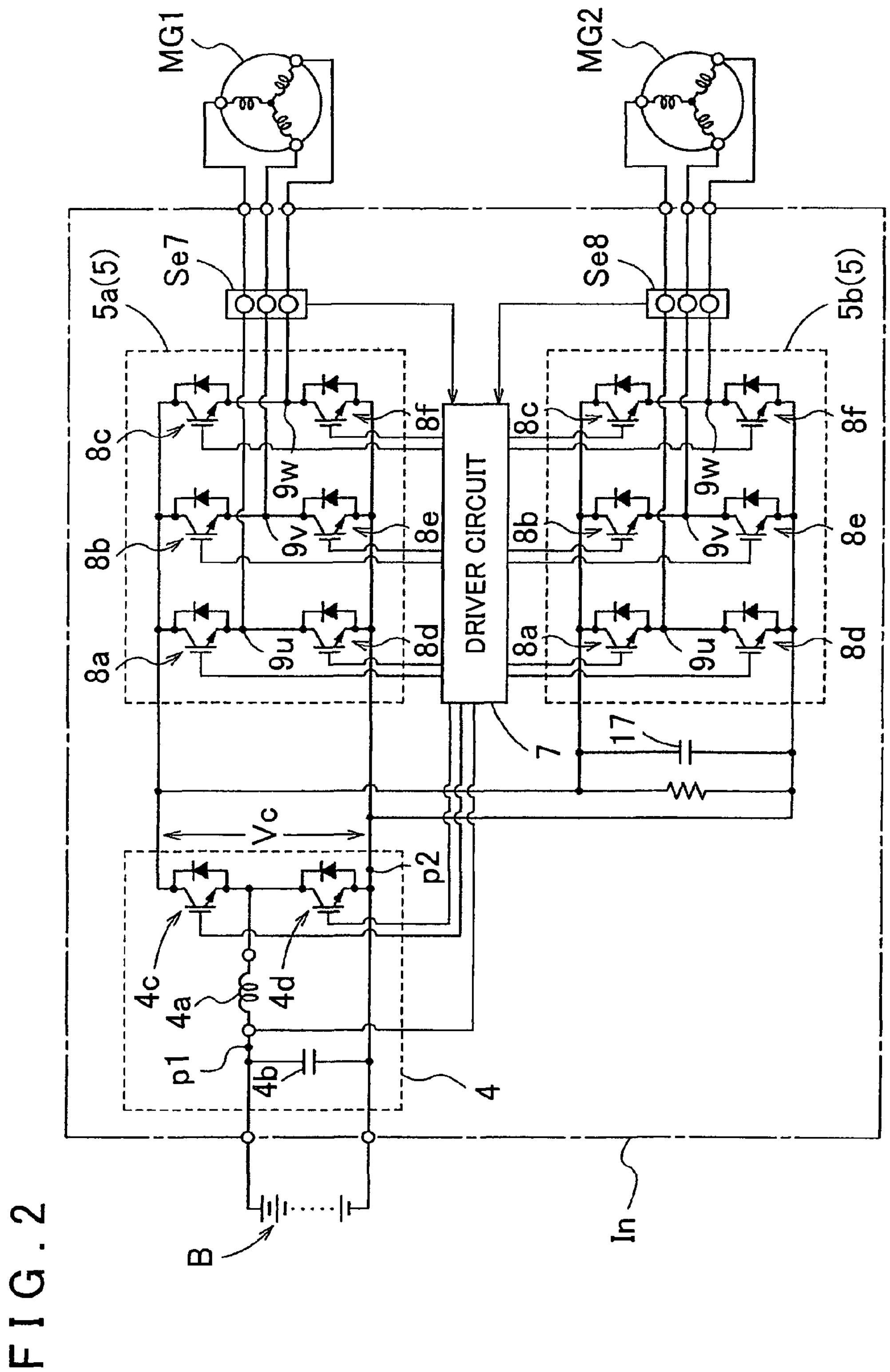
F I G . 2
MG1
MG2
Se7
Se8
5a(5)
5b(5)
8a
8b
8c
8d
8e
8f
9u
9v
9w
DRIVER CIRCUIT
7
17
Vc
p1
p2
4
4a
4b
4c
4d
B
In

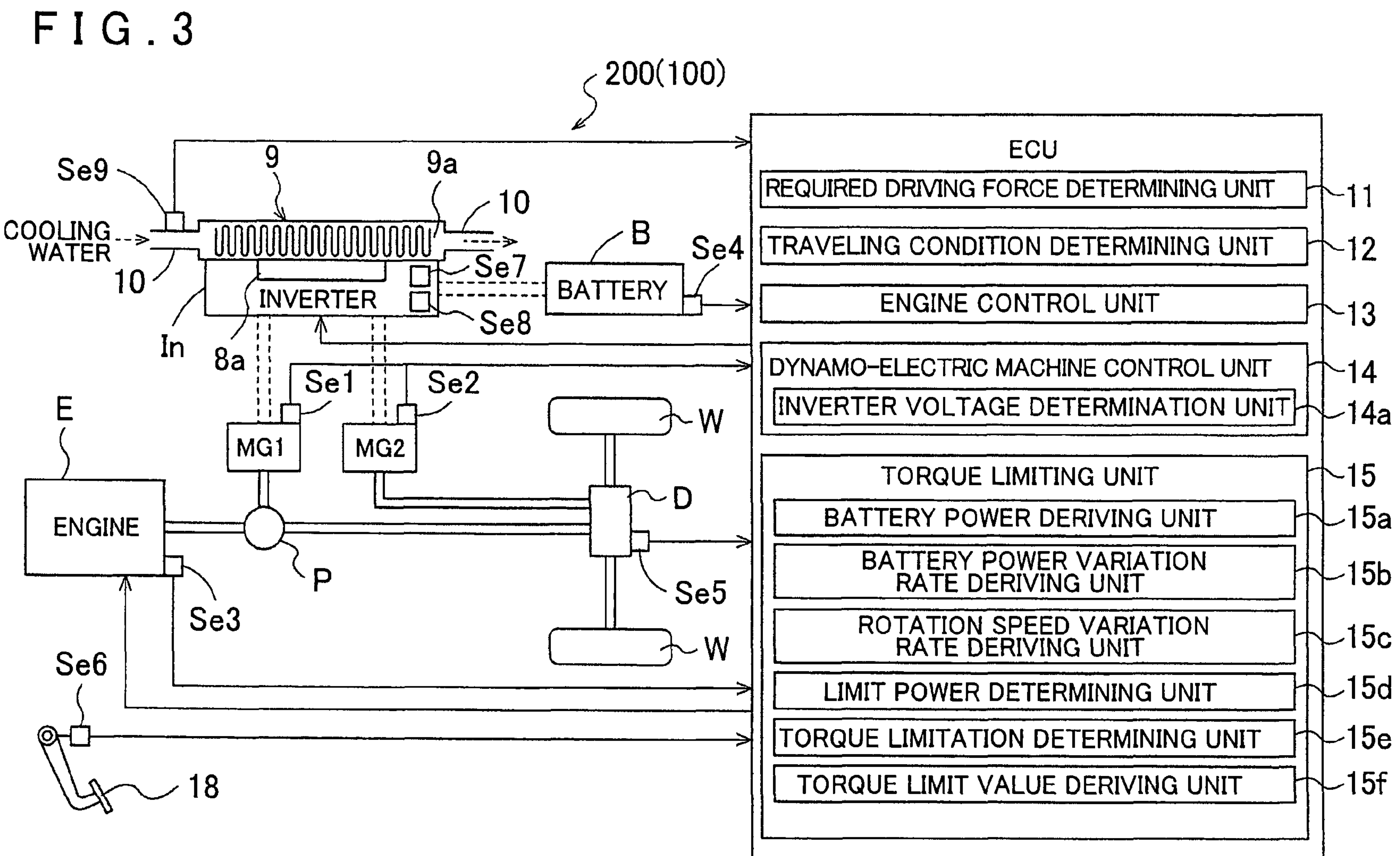
F I G . 3
200(100)
ECU
REQUIRED DRIVING FORCE DETERMINING UNIT
11
TRAVELING CONDITION DETERMINING UNIT
12
ENGINE CONTROL UNIT
13
DYNAMO-ELECTRIC MACHINE CONTROL UNIT
14
INVERTER VOLTAGE DETERMINATION UNIT
14a
TORQUE LIMITING UNIT
15
BATTERY POWER DERIVING UNIT
15a
BATTERY POWER VARIATION RATE DERIVING UNIT
15b
ROTATION SPEED VARIATION RATE DERIVING UNIT
15c
LIMIT POWER DETERMINING UNIT
15d
TORQUE LIMITATION DETERMINING UNIT
15e
TORQUE LIMIT VALUE DERIVING UNIT
15f
Se9
9
9a
10
COOLING WATER
10
B
Se4
Se7
BATTERY
INVERTER
Se8
In
8a
Se1
Se2
E
MG1
MG2
W
ENGINE
D
P
Se5
Se3
W
Se6
18

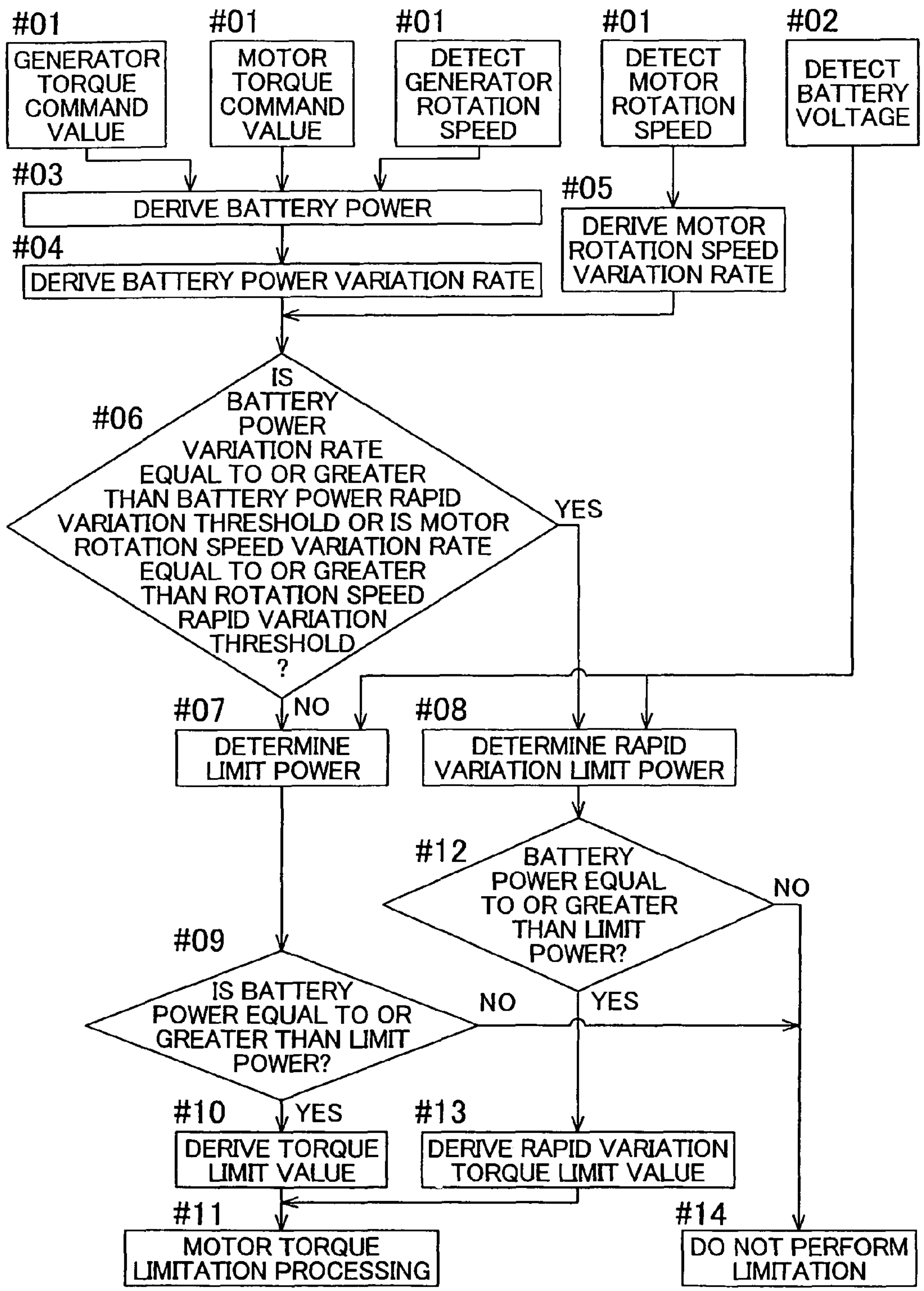
F I G . 7
01
GENERATOR TORQUE COMMAND VALUE
01
MOTOR TORQUE COMMAND VALUE
01
DETECT GENERATOR ROTATION SPEED
01
DETECT MOTOR ROTATION SPEED
02
DETECT BATTERY VOLTAGE
03
DERIVE BATTERY POWER
05
DERIVE MOTOR ROTATION SPEED VARIATION RATE
04
DERIVE BATTERY POWER VARIATION RATE
06
IS BATTERY POWER VARIATION RATE EQUAL TO OR GREATER THAN BATTERY POWER RAPID VARIATION THRESHOLD OR IS MOTOR ROTATION SPEED VARIATION RATE EQUAL TO OR GREATER THAN ROTATION SPEED RAPID VARIATION THRESHOLD ?
YES
NO
07
DETERMINE LIMIT POWER
08
DETERMINE RAPID VARIATION LIMIT POWER
12
BATTERY POWER EQUAL TO OR GREATER THAN LIMIT POWER?
NO
YES
09
IS BATTERY POWER EQUAL TO OR GREATER THAN LIMIT POWER?
NO
YES
10
DERIVE TORQUE LIMIT VALUE
13
DERIVE RAPID VARIATION TORQUE LIMIT VALUE
11
MOTOR TORQUE LIMITATION PROCESSING
14
DO NOT PERFORM LIMITATION MOTOR TORQUE COMMAND VALUE (REQUIRED TORQUE)
FIRST LIMIT POWER
SECOND LIMIT POWER
RAPID VARIATION FIRST LIMIT POWER
RAPID VARIATION SECOND LIMIT POWER
BATTERY POWER
MOTOR ROTATION SPEED
TORQUE LIMITATION FLAG
ON
OFF
MOTOR ROTATION SPEED RAPID VARIATION FLAG
ON
OFF
BATTERY POWER RAPID VARIATION FLAG
ON
OFF
TIME

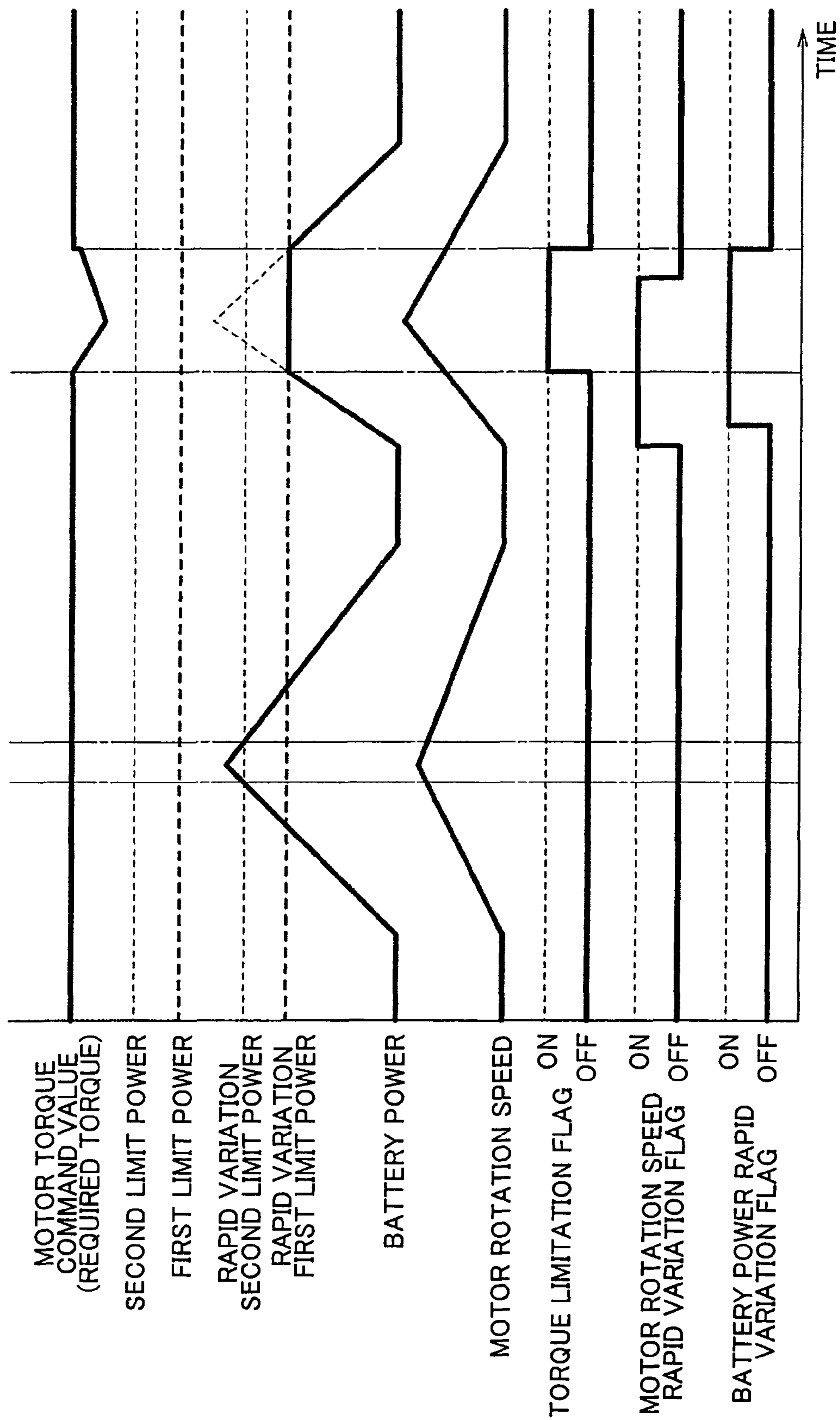
F I G . 9
MOTOR TORQUE COMMAND VALUE (REQUIRED TORQUE)
SECOND LIMIT POWER
FIRST LIMIT POWER
RAPID VARIATION SECOND LIMIT POWER
RAPID VARIATION FIRST LIMIT POWER
BATTERY POWER
MOTOR ROTATION SPEED
TORQUE LIMITATION FLAG
ON
OFF
MOTOR ROTATION SPEED RAPID VARIATION FLAG
ON
OFF
BATTERY POWER RAPID VARIATION FLAG
ON
OFF
TIME

DYNAMO-ELECTRIC MACHINE CONTROL SYSTEM AND VEHICLE DRIVING SYSTEM INCLUDING THE SAME

CROSS-REFERENCE TO RELATED APPLICATION

The disclosure of Japanese Patent Application No. 2008-198109 filed on Jul. 31, 2008 including the specification, drawings and abstract is incorporated herein by reference in its entirety.

BACKGROUND

The present invention relates to a dynamo-electric machine control system for controlling a motor and a generator, and a vehicle driving system including the dynamo-electric machine control system.

In recent years, hybrid vehicles having both an engine and a dynamo-electric machine (a motor or a generator) as driving force sources have come to attention due to concerns about the environment and energy consumption. In this type of hybrid vehicle, the dynamo-electric machine is connected to a battery for supplying electric power to the dynamo-electric machine, and a current flowing to the dynamo-electric machine is controlled by an inverter interposed between the dynamo-electric machine and the battery. Here, when an excessive current is drawn from the battery to the inverter, problems such as a reduction in the durability of the battery and damage to a switching device or the like may occur, and therefore a torque of the dynamo-electric machine is sometimes limited under fixed conditions.

For example, Japanese Patent Application Publication No. JP-A-2005-210779 describes that a dynamo-electric machine control system has a dynamo-electric machine and an inverter that is interposed between a battery and the dynamo-electric machine and controls a current flowing through the dynamo-electric machine, and in the dynamo-electric machine control system, a rotation speed and an output torque of the dynamo-electric machine are controlled by the inverter. In this dynamo-electric machine control system, a limit power of a predetermined magnitude (having a fixed value) is set. The dynamo-electric machine control system estimates a battery power from a sum of a power consumed by the dynamo-electric machine when operating at the rotation speed and output torque, and a rate of change in a stored power of a smoothing capacitor annexed to a circuit constituting the inverter. The dynamo-electric machine control system then limits a torque command relating to the dynamo-electric machine to ensure that the estimated battery power does not exceed the predetermined limit power. Hence, a situation in which an excessive current is drawn from the battery can be prevented while taking into consideration variation in the stored power of the smoothing capacitor.

SUMMARY

In the dynamo-electric machine control system described in Japanese Patent Application Publication No. JP-A-2005-210779, the battery power can be limited to or below the predetermined limit power. However, the limit power is fixed at a constant value, and therefore, in a state where an open-circuit voltage (a battery voltage when the battery current is zero) of the battery connected to the dynamo-electric machine control system decreases, for example when the dynamo-electric machine control system is disposed in an extremely low-temperature environment or an internal resistance increases due to deterioration of the battery, an excessive current is drawn from the battery to secure a battery power of a fixed magnitude, even within the limit power. In this case, the battery or a switching device cannot be protected appropriately.

The present invention has been designed in consideration of the problem described above, and it is an object of the present invention to provide a dynamo-electric machine control system capable of protecting a battery and a switching device appropriately even when a battery voltage decreases.

To achieve this object, a dynamo-electric machine control system according to a first aspect of the present invention having a dynamo-electric machine and an inverter that is interposed between a battery and the dynamo-electric machine and that controls a current flowing through the dynamo-electric machine, wherein a rotation speed and an output torque of the dynamo-electric machine are controlled by the inverter, has a characteristic constitution including: a battery power deriving unit that derives a battery power to be supplied from the battery when the dynamo-electric machine is operated at the rotation speed and the output torque; a limit power determining unit that variably determines a limit power, which is a maximum allowable value of the battery power, in accordance with a battery voltage; and a torque limiting unit that limits the torque of the dynamo-electric machine such that the battery power derived by the battery power deriving unit does not exceed the limit power.

Note that in this application, the term “dynamo-electric machine” is used as a concept including a motor, a generator, and if necessary, a motor/generator that functions as both a motor and a generator. Further, unless otherwise indicated, in this specification, the term “dynamo-electric machine” is used as a comprehensive concept denoting one or both of a first dynamo-electric machine and a second dynamo-electric machine.

In a dynamo-electric machine control system in which the rotation speed and output torque of a dynamo-electric machine are controlled by an inverter, when the battery voltage of a battery connected to the inverter decreases, a battery current becomes excessive in order to secure a battery power of a fixed magnitude. By employing the characteristic constitution according to the first aspect as described above such that the limit power determining unit variably determines the limit power in accordance with the battery voltage, however, the limit power can be determined such that the battery current does not become excessive even when the battery voltage decreases. It is therefore possible to prevent situations in which an excessive current is drawn from the battery even when the battery voltage decreases. Hence, a dynamo-electric machine control system which is capable of protecting a battery and a switching device appropriately can be provided.

Here, it is preferable that the limit power determining unit determine the smaller of a first limit power, which is set at a fixed value regardless of the battery voltage, and a second limit power, which is set such that a battery current remains smaller than a predetermined overcurrent threshold even when the battery voltage varies, as the limit power.

According to this constitution, the limit power can be determined appropriately within a wide range corresponding to the battery voltage. For example, when an open-circuit voltage (the battery voltage when the battery current is zero) of the battery is within a predetermined normal range, the limit power can be determined appropriately by setting the first limit power (corresponding to the predetermined limit power used in the related art), which takes a fixed value regardless of the battery voltage. Further, when the open-circuit voltage of the battery decreases so as to fall out of the normal range, the limit power can be determined appropriately by setting the second limit power, which is set such that the battery current remains smaller than the predetermined overcurrent threshold even when the battery voltage varies. Thus, the battery and switching device can be protected appropriately within a wide range corresponding to the battery voltage.

Further, it is preferable that the second limit power be set on the basis of an integrated value of the overcurrent threshold and the battery voltage.

According to this constitution, the second limit power can be set appropriately using the overcurrent threshold as a reference.

Further, it is preferable that the first limit power and the second limit power be set by subtracting in advance a value corresponding to a control delay power, which is an increase in the battery power caused by a control delay relative to the dynamo-electric machine.

When actual control is performed on the dynamo-electric machine, a slight control delay is inevitable with current technology. Therefore, the battery power continues to increase from the time point at which torque limitation is applied to the time point at which the battery power is actually limited. By employing the constitution described above such that the first limit power and second limit power are set by subtracting a value corresponding to the control delay power in advance, however, the increase in battery power generated by the control delay can be absorbed, thereby preventing an overcurrent.

Further, it is preferable that a battery power variation rate deriving unit that derives a variation rate of the battery power be provided, and during rapid variation in which the battery power variation rate derived by the battery power variation rate deriving unit is larger than a predetermined battery power rapid variation threshold, a rapid variation second limit power, which is set at a smaller value than the second limit power, be set instead of the second limit power.

During rapid variation in which the battery power variation rate is larger than the predetermined battery power rapid variation threshold, an increase of the battery power caused by a delay in the control executed on the dynamo-electric machine is greater than a normal increase. By employing the above constitution such that when rapid variation occurs, the rapid variation second limit power having a smaller value than the second limit power is set instead of the second limit power, however, an increase in battery power generated by a control delay can be absorbed when the battery voltage decreases, even if the increase is greater than a normal increase, and as a result, an overcurrent can be prevented.

Further, it is preferable that rotation speed variation rate deriving unit that derives a variation rate in the rotation speed of the dynamo-electric machine be provided, and during rapid variation in which the rotation speed variation rate derived by the rotation speed variation rate deriving unit is larger than a predetermined rotation speed rapid variation threshold, a rapid variation second limit power, which is set at a smaller value than the second limit power, be set instead of the second limit power.

During rapid variation in which the rotation speed variation rate is larger than the predetermined rotation speed rapid variation threshold, the increase of the battery power caused by a delay in the control executed on the dynamo-electric machine is greater than the normal increase. By employing the above constitution such that when rapid variation occurs, the rapid variation second limit power having a smaller value than the second limit power is set instead of the second limit power, however, an increase in battery power generated by a control delay can be absorbed when the battery voltage decreases, even if the increase is greater than a normal increase. As a result, an overcurrent can be prevented.

Further, it is preferable that during the rapid variation, a rapid variation first limit power, which is set at a smaller value than the first limit power, be set instead of the first limit power.

According to this constitution, an increase in battery power generated by a control delay can be absorbed not only when the battery voltage decreases, but also when the battery voltage is within a normal range, even if the increase is greater than a normal increase. As a result, an overcurrent can be prevented.

A vehicle driving system according to a second aspect of the present invention has a characteristic constitution including the dynamo-electric machine control system described heretofore, a first dynamo-electric machine and a second dynamo-electric machine serving as the dynamo-electric machine, and a power transfer mechanism for distributing a driving force generated by a drive source other than the first dynamo-electric machine and the second dynamo-electric machine, wherein one of the driving force distributed by the power transfer mechanism is transmitted to a vehicle wheel, another one of the driving force distributed by the power transfer mechanism is transmitted to the first dynamo-electric machine, and a driving force generated by the second dynamo-electric machine is transmitted to the vehicle wheel.

This characteristic constitution according to the second aspect can realize a vehicle driving system that includes a pair of dynamo-electric machines and a drive source other than the pair of dynamo-electric machines and that performs so-called split power transfer, exhibiting the advantages of the dynamo-electric machine control system described heretofore. Further, the vehicle driving system can be realized in a manner such that the pair of dynamo-electric machines operate to satisfy a rotation speed and a torque required of the dynamo-electric machines.

Here, it is preferable that the power transfer mechanism include a planetary gear mechanism having, in order of rotation speed, a first rotary element, a second rotary element, and a third rotary element, wherein the first dynamo-electric machine is connected to the first rotary element, the drive source other than the dynamo-electric machine is connected to the second rotary element, and the second dynamo-electric machine and the third rotary element are connected to the vehicle wheel.

Note that in this application, the term "connection" is used as a concept including not only a direct connection between members, but also an indirect connection between members via one or more members.

According to this constitution, a vehicle driving system that performs split power transfer can be realized using a single planetary gear mechanism.

BRIEF DESCRIPTION OF THE DRAWINGS

FIG. 2 is a schematic view showing a dynamo-electric machine control system of the vehicle driving system;

FIG. 3 is a schematic view showing the entire vehicle driving system;

FIG. 7 is a flowchart showing a processing procedure of torque limitation processing;

FIG. 9 is a timing chart showing torque limitation when the battery voltage is high.

DETAILED DESCRIPTION OF EMBODIMENTS

Figure 1:
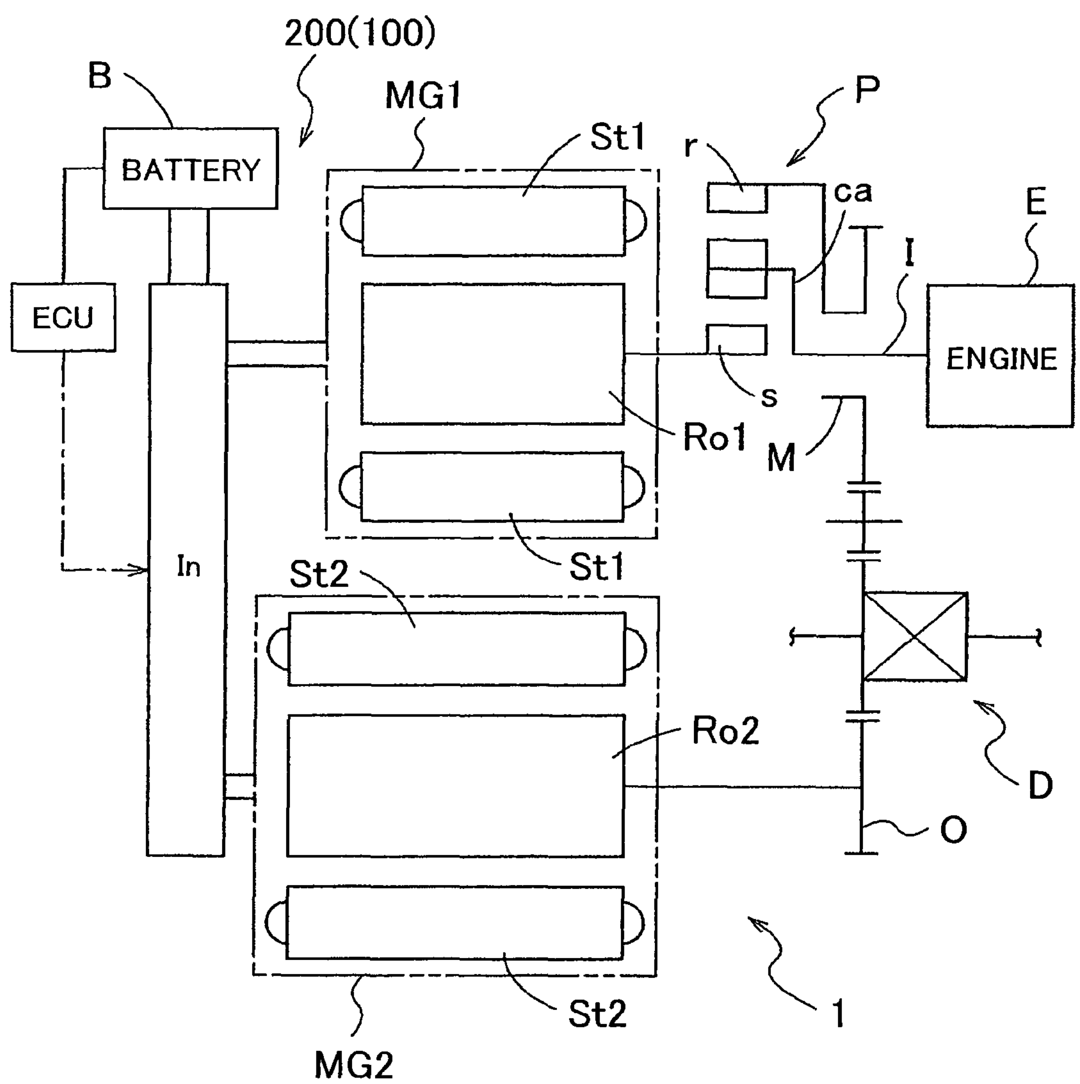
FIG. 1 is a schematic view showing a driving system of a vehicle driving system.
Figure 4:
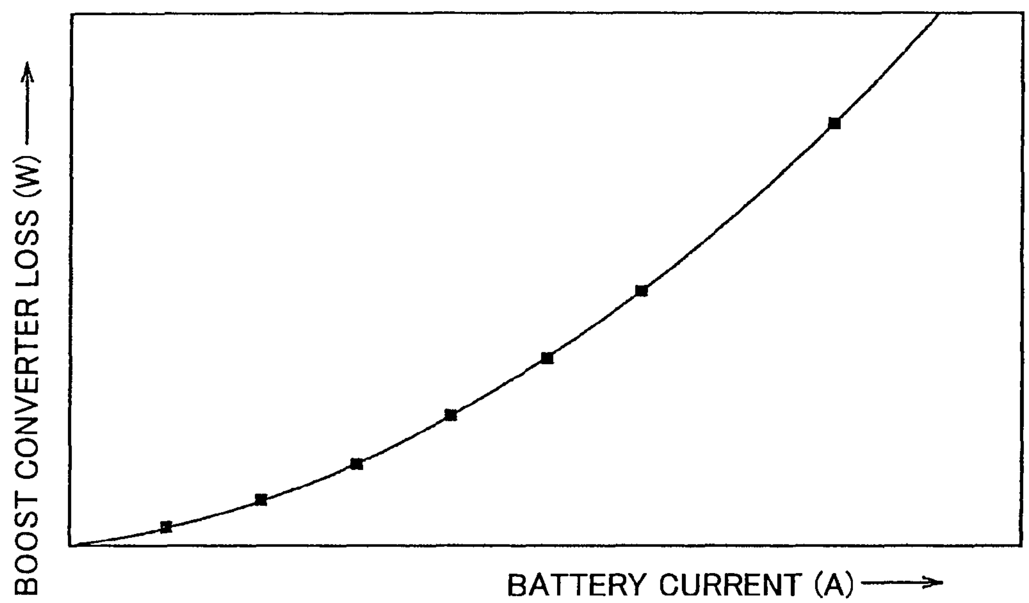
FIG. 4 is a view showing a map of boost converter loss.
Figure 5:
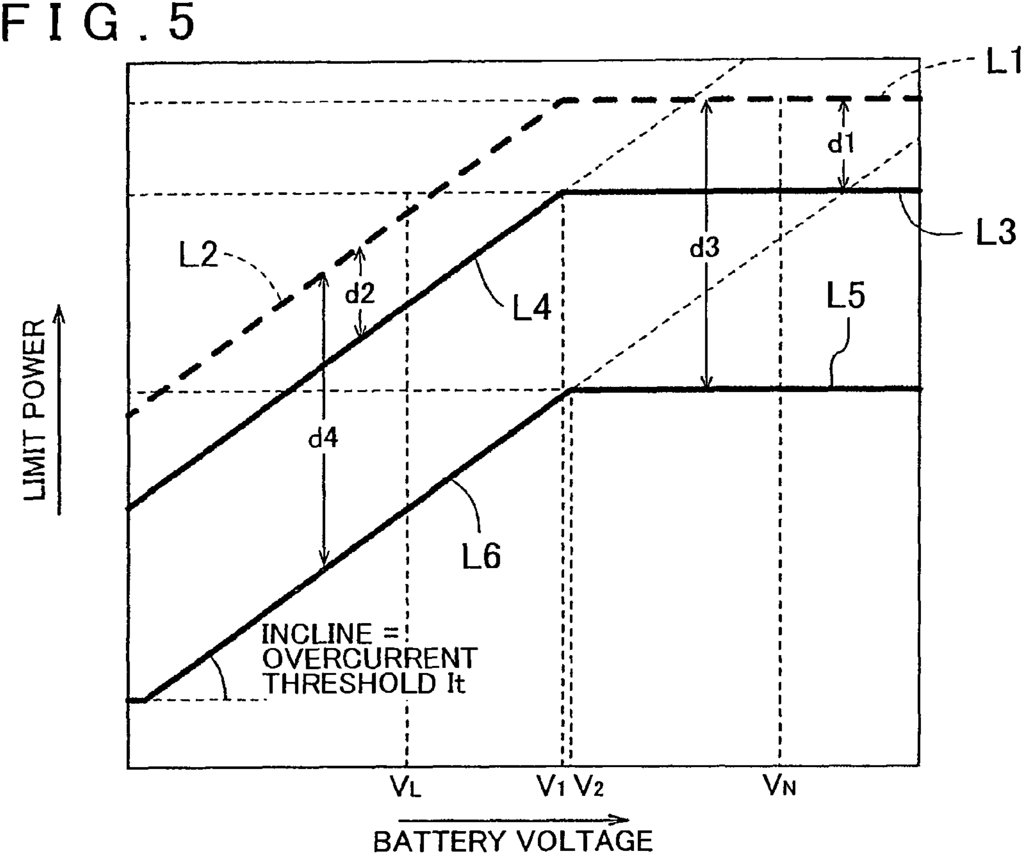
FIG. 5 is a view showing an example of a map used to determine a limit power.
Figure 6:
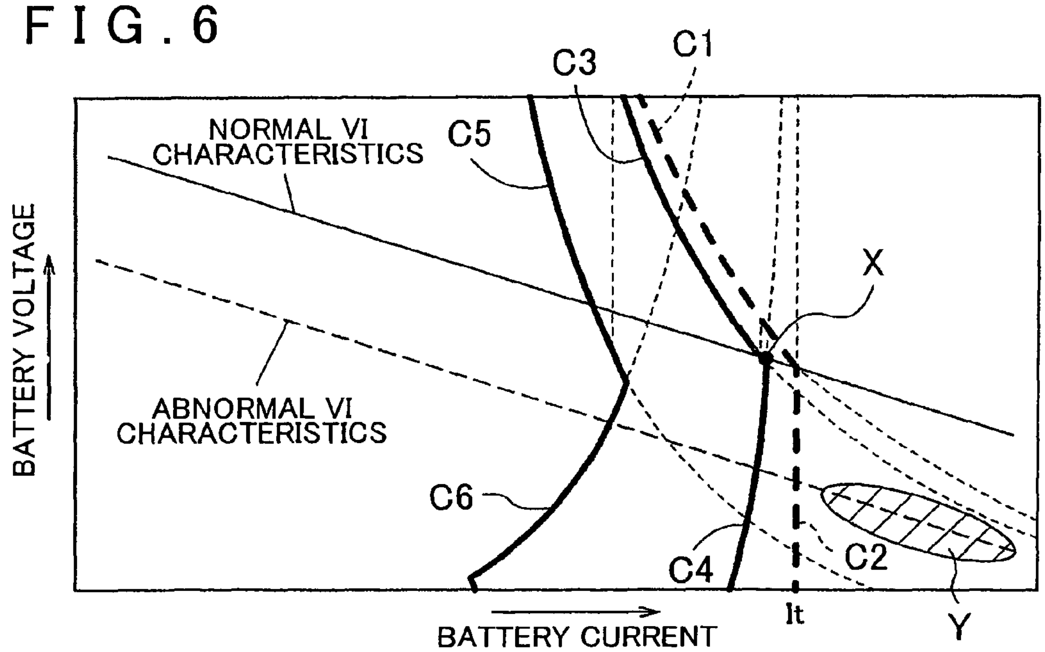
FIG. 6 is a view showing a relationship between the limit power and battery characteristics.

An embodiment of a dynamo-electric machine control system according to the present invention will be described below with reference to the drawings. A dynamo-electric machine control system 100 is incorporated into a vehicle driving system 200, and performs operation control on dynamo-electric machines MG1, MG2 provided in the vehicle driving system 200. FIG. 1 is a schematic view showing a driving system of the vehicle driving system 200. FIG. 2 is a schematic view showing the dynamo-electric machine control system 100 of the vehicle driving system 200. FIG. 3 is a schematic view showing the entire vehicle driving system 200. Note that in FIG. 3, solid line arrows denote transmission paths of various types of information, double solid lines denote a transmission path of a driving force, and double broken lines denote a power transmission path. FIG. 4 is a view showing a map of boost converter loss. FIG. 5 is a view showing an example of a map used to determine a limit power. FIG. 6 is a view showing a relationship between the limit power and battery characteristics.

1. Driving System

As shown in FIGS. 1 and 3, a vehicle is provided with an engine E, which is an internal combustion engine, and a pair of dynamo-electric machines MG1, MG2. The vehicle driving system 200 is a so-called hybrid system in which a hybrid driving apparatus 1 is provided between the engine E and vehicle wheels W. Various well-known types of internal combustion engines, such as a gasoline engine or a diesel engine, may be used as the engine E. As will be described below, the dynamo-electric machines MG1, MG2 operate respectively as a motor and a generator. Therefore, in the following description, the reference symbols MG1, MG2 may be omitted when there is no particular need to identify the dynamo-electric machines. The vehicle becomes capable of traveling upon reception of a driving force transmitted from the engine E or the dynamo-electric machine operating as a motor. Further, at least a part of the driving force generated by the engine E is converted into electric power in the dynamo-electric machine operating as a generator and used to charge a battery B or drive the dynamo-electric machine operating as a motor. Furthermore, during braking, the dynamo-electric machine generates power using a braking force, and the generated power may be used to regenerate the battery B.

An input shaft I of the hybrid driving apparatus 1 is connected to an output rotary shaft, such as a crankshaft, of the engine E. Note that the input shaft I is preferably connected to the output rotary shaft of the engine E via a damper, a clutch, and so on. An output of the hybrid driving apparatus 1 is transmitted to the vehicle wheels W via a differential apparatus D and so on. Further, the input shaft I is connected to a carrier ca of a power transfer mechanism P, and an intermediate shaft M connected to the vehicle wheels W via the differential apparatus D is connected to a ring gear r.

The first dynamo-electric machine MG1 includes a stator St1 and a rotor Ro1 that is rotatably supported on a radially inner side of the stator St1. The rotor Ro1 of the first dynamo-electric machine MG1 is connected to a sun gear s of the power transfer mechanism P so as to rotate integrally therewith. Further, the second dynamo-electric machine MG2 includes a stator St2 and a rotor Ro2 that is rotatably supported on a radially inner side of the stator St2. The rotor Ro2 of the second dynamo-electric machine MG2 is connected to an output gear O so as to rotate integrally therewith, and also connected to an input side of the differential apparatus D. As shown in FIGS. 1 and 3, the first dynamo-electric machine MG1 and second dynamo-electric machine MG2 are electrically connected to the battery B via an inverter In. The inverter In is structured to be cooled through heat exchange with cooling water. The first dynamo-electric machine MG1 and second dynamo-electric machine MG2 are both capable of functioning as a motor that generates motive power upon reception of a supply of electric power, and a generator that generates electric power upon reception of a supply of motive power.

In a constitutional example of this embodiment, the first dynamo-electric machine MG1 functions mainly as a generator which performs power generation using a driving force input via the sun gear s of the power transfer mechanism P, and supplies power to charge the battery B or drive the second dynamo-electric machine MG2. Note, however, that when the vehicle travels at high speed or the like, the first dynamo-electric machine MG1 may function as a motor. Meanwhile, the second dynamo-electric machine MG2 functions mainly as a motor for supplementing a driving force for causing the vehicle to travel. Further, when the vehicle decelerates or the like, the second dynamo-electric machine MG2 functions as a generator for regenerating an inertial force of the vehicle as electric energy. The first dynamo-electric machine MG1 and second dynamo-electric machine MG2 are operated in accordance with control commands from a control apparatus ECU.

As shown in FIG. 1, the power transfer mechanism P is constituted by a single pinion type planetary gear mechanism disposed coaxially with the input shaft I. More specifically, the power transfer mechanism P includes, as rotary elements, the carrier ca for supporting a plurality of pinion gears, the sun gear s and the ring gear r that mesh with the respective pinion gears. The sun gear s, which serves as a first rotary element, is connected to the rotor Ro1 of the first dynamo-electric machine MG1 so as to rotate integrally therewith. The carrier ca, which serves as a second rotary element, is connected to the input shaft I connected to the output rotary shaft of the engine E so as to rotate integrally therewith. The ring gear r, which serves as a third rotary element, is connected to the intermediate shaft M so as to rotate integrally therewith, and is connected to the differential apparatus D via the intermediate shaft M. In this power transfer mechanism P, three rotary elements are provided, namely, in order of rotation speed, the sun gear s (first rotary element), the carrier ca (second rotary element), and the ring gear r (third rotary element). Here, the term "in order of rotation speed" may indicate either descending order of rotation speed or ascending order of rotation speed, and depending on the rotation state of the power transfer mechanism P, either order is possible.

In the constitution shown in FIG. 1, the first dynamo-electric machine MG1 is connected to the sun gear s serving as the first rotary element, and the engine E, i.e. the drive source other than the dynamo-electric machines MG1 and MG2, is connected to the carrier ca serving as the second rotary element. The second dynamo-electric machine MG2 and the ring gear r serving as the third rotary element are connected to the vehicle wheels W via the differential apparatus D (see FIG. 3). However, the driving system is not limited to this constitution. The second dynamo-electric machine MG2 may be connected directly to the differential apparatus D, or may be connected to the third rotary element or another drive transmission element and connected to the differential apparatus D via that rotary element or drive transmission element.

2. Dynamo-electric Machine Control System

FIG. 2 is a block diagram showing in pattern form the constitution of a dynamo-electric machine control system having the inverter In as a core. The dynamo-electric machine control system includes the battery B, the dynamo-electric machines MG1, MG2, and the inverter In interposed between the battery B and the dynamo-electric machines MG1, MG2. Further, the inverter In includes a voltage conversion unit 4 and a frequency conversion unit 5 in series from the battery B side. In this embodiment, as shown in FIG. 2, frequency conversion units 5*a*, 5*b* are provided for the pair of dynamo-electric machines MG1, MG2, respectively, as the frequency conversion unit 5. Current sensors (first dynamo-electric machine current sensor Se7, second dynamo-electric machine current sensor Se8) for measuring currents flowing through the dynamo-electric machines are provided between the frequency conversion unit 5 and the respective dynamo-electric machines MG1, MG2. Note that in this example, all three phases of the current are measured, but since the three phases are in an equilibrium state and a sum total of an instantaneous value is zero, only two phases of the current may be measured and the remaining phase of the current may be calculated in the control apparatus ECU. The battery B is capable of supplying power to the dynamo-electric machines MG1, MG2 and storing power received from the dynamo-electric machines MG1, MG2.

The voltage conversion unit 4 is constituted by a reactor 4*a*, a filter capacitor 4*b*, and an upper/lower pair of switching devices 4*c*, 4*d*. IGBTs (insulated gate bipolar transistors) or MOSFETs (metal oxide semiconductor field effect transistors) are preferably employed as the switching devices 4*c*, 4*d*. In this embodiment, an example in which IGBTs are used will be described.

A source of the upper stage switching device 4*c* of the voltage conversion unit 4 is connected to a drain of the lower stage switching device 4*d* and connected to a positive side of the battery B via the reactor 4*a*. A drain of the upper stage switching device 4*c* is connected to an input positive side of the frequency conversion unit 5. A source of the lower stage switching device 4*d* is connected to a negative side (ground) of the battery B. An input negative side of the frequency conversion unit 5 is also grounded, and therefore the source of the lower stage switching device 4*d* is connected to the input negative side of the frequency conversion unit 5.

Gates of the upper stage switching device 4*c* and lower stage switching device 4*d* are connected to a driver circuit 7. The switching devices 4*c*, 4*d* are PWM controlled from the driver circuit 7 on the basis of a required voltage, which is a voltage command output by a dynamo-electric machine control unit 14 to be described below, so as to boost a voltage output from the battery B and supply the boosted voltage to the frequency conversion unit 5. Upon reception of power from the dynamo-electric machines MG1, MG2, on the other hand, the switching devices 4*c*, 4*d* boost a voltage output from the frequency conversion unit 5 and supply the boosted voltage to the battery B.

The frequency conversion unit 5 is constituted by a bridge circuit. Two switching devices are connected in series between the input positive side and the input negative side of the frequency conversion unit 5 to form a series circuit, and three sets of the series circuits thus constituted are connected in parallel to each other. In other words, a bridge circuit is formed such that a set of series circuit corresponds to each of the U phase, V phase and W phase of stator coils in each of the dynamo-electric machines MG1, MG2. In FIG. 2, reference symbol 8*a* indicates a U-phase upper stage side switching device, reference symbol 8*b* indicates a V-phase upper stage side switching device, reference symbol 8*c* indicates a W-phase upper stage side switching device, reference symbol 8*d* indicates a U-phase lower stage side switching device, reference symbol 8*e* indicates a V-phase lower stage side switching device, and reference symbol 8*f* indicates a W-phase lower stage side switching device. Note that IGBTs or MOSFETs are preferably employed as the switching devices 8*a* to 8*f* of the frequency conversion unit 5. In this embodiment, an example in which IGBTs are used will be described.

As shown in FIG. 2, drains of the upper stage side switching devices 8*a*, 8*b*, 8*c* of each phase are connected to an output positive side of the voltage conversion unit 4 (the input positive side of the frequency conversion unit 5), and sources thereof are connected to drains of the lower stage side switching devices 8*d*, 8*e*, 8*f* of each phase. Further, sources of the lower stage side switching devices 8*d*, 8*e*, 8*f* of each phase are connected to an output negative side of the voltage conversion unit 4 (the input negative side of the frequency conversion unit 5), or in other words the negative side (ground) of the battery B. Gates of the respective switching devices 8*a* to 8*f* are connected to the driver circuit 7 and subjected to individual switching control.

Intermediate points (switching device connection points) 9*u*, 9*v*, 9*w* of the series circuits formed by the respective phase pairs of switching devices (8*a*, 8*d*), (8*b*, 8*e*), (8*c*, 8*f*) are respectively connected to U-phase, V-phase, W-phase stator windings of the dynamo-electric machines MG1, MG2. Drive currents supplied to the windings are detected by the current sensors Se7, Se8. Detection values output by the current sensors Se7, Se8 are transmitted to the control apparatus ECU via the driver circuit 7 and used in feedback control.

The driver circuit 7 supplies a three-phase alternating current drive current to the respective dynamo-electric machines MG1, MG2 by PWM controlling the switching devices 8*a* to 8*f* on the basis of a required rotation speed and a required torque output from the dynamo-electric machine control unit 14 to be described below. Accordingly, the dynamo-electric machines MG1, MG2 are powered in accordance with the required rotation speed and required torque (a limit torque when torque limitation is implemented). When the dynamo-electric machines MG1, MG2 operate as generators such that power is received from the dynamo-electric machines, the driver circuit 7 controls the frequency conversion unit 5 to convert an alternating current of a predetermined frequency into a direct current.

As shown in pattern form in FIG. 3, the inverter In includes a heat exchanger 9 for cooling the switching devices 4*c*, 4*d*, 8*a* to 8*f*, which generate heat when electrified, resulting in an increase in temperature. The switching device 8*a* (the other switching devices are not shown in the drawing) is adhered and fixed to one outside face of the heat exchanger 9, and a cooling water passage 9*a* through which cooling water serving as a coolant flows is formed in the interior of the heat exchanger 9. One end and the other end of a cooling water circulation passage 10 are connected to an inlet and an outlet of the cooling water passage 9*a* such that the temperature of high-temperature cooling water delivered from the heat exchanger 9 is reduced in the cooling water circulation passage 10, and the cooled cooling water to the heat exchanger 9.

3. Vehicle Driving System

The overall vehicle driving system 200 according to this application will be described below on the basis of FIG. 3, focusing on the control apparatus ECU that forms the core of the system.

As shown in FIG. 3, the control apparatus ECU performs operation control on the engine E, the first dynamo-electric machine MG1, the second dynamo-electric machine MG2, and so on using information obtained by sensors Se1 to Se9 provided in various parts of the vehicle. It is assumed here that operation control of the first dynamo-electric machine MG1 and second dynamo-electric machine MG2 is executed via the inverter In described above.

In this example, a first dynamo-electric machine rotation speed sensor Se1, a second dynamo-electric machine rotation speed sensor Se2, an engine rotation speed sensor Se3, a battery state detection sensor Se4, a vehicle speed sensor Se5, an accelerator operation detection sensor Se6, the first dynamo-electric machine current sensor Se7, the second dynamo-electric machine current sensor Se8, and a cooling water temperature sensor Se9 are provided as the sensors.

The first dynamo-electric machine rotation speed sensor Se1 is a sensor for detecting a rotation speed of the rotor Ro1 of the first dynamo-electric machine MG1. The second dynamo-electric machine rotation speed sensor Se2 is a sensor for detecting a rotation speed of the rotor Ro2 of the second dynamo-electric machine MG2. The engine rotation speed sensor Se3 is a sensor for detecting a rotation speed of the output rotary shaft of the engine E. In this example, the input shaft I rotates integrally with the output rotary shaft of the engine E, and therefore the rotation speed of the engine E detected by the engine rotation speed sensor Se3 matches a rotation speed of the input shaft I. The battery state detection sensor Se4 is a sensor for detecting a state of charge of the battery B, a current (battery current) flowing through the battery, a voltage (battery voltage) of the battery, and so on. The vehicle speed sensor Se5 is a sensor for detecting a rotation speed of an input shaft (not shown) of the differential apparatus D in order to detect the vehicle speed. The accelerator operation detection sensor Se6 is a sensor for detecting an operation amount of an accelerator pedal 18. The first dynamo-electric machine current sensor Se7 and second dynamo-electric machine current sensor Se8 are provided in the inverter In to detect the currents flowing through the first dynamo-electric machine MG1 and the second dynamo-electric machine MG2, respectively. The cooling water temperature Se9 is provided in the inlet of the cooling water passage 9*a* to detect the temperature of the cooling water.

The control apparatus ECU includes a required driving force determining unit 11, a traveling condition determining unit 12, an engine control unit 13, and the dynamo-electric machine control unit 14. Further, the control apparatus ECU is provided with a torque limiting unit 15 that executes torque limitation under a predetermined condition. The respective units provided in the control apparatus ECU have a shared or individual calculation processing device such as a CPU as a core member, and function units thereof for performing various types of processing on input data are constituted by hardware, software (programs), or both.

The required driving force determining unit 11 calculates a required driving force output by a driver on the basis of the output of the vehicle speed sensor Se5 and the accelerator operation detection sensor Se6.

The traveling condition determining unit 12 determines traveling conditions required of the vehicle on the basis of vehicle speed information obtained from the vehicle speed sensor Se5, required driving force information obtained from the required driving force determining unit 11, information relating to the state of charge of the battery obtained from the battery state detection sensor Se4, and so on in accordance with a map or the like prepared in advance. The traveling conditions at this time include the rotation speed (required rotation speed) and output torque (required torque) of the engine E, and the rotation speed (required rotation speed) and output torque (required torque) of each of the first dynamo-electric machine MG1 and second dynamo-electric machine MG2.

To describe an example of traveling condition determination by the traveling condition determining unit 12, when the charge of the battery B is sufficient, for example, an operating condition in which the engine E is maintained in a state of high efficiency and low exhaust gas emission (typical optimum fuel efficiency characteristics) is set as the rotation speed and torque required of the engine E. A torque deficiency occurring corresponding to the operating condition of the engine E is then set as the torque required of the second dynamo-electric machine MG2, and a torque to be transferred to the first dynamo-electric machine MG1 by the power transfer mechanism P is set as the torque required of the first dynamo-electric machine MG1 (in this state, the first dynamo-electric machine MG1 operates as a generator, and therefore the required torque is negative). The rotation speed to be output by the first dynamo-electric machine MG1 and second dynamo-electric machine MG2 is then determined as the required rotation speed in accordance with the constitution of the power transfer mechanism P, a gear ratio of gears provided in the driving system, and so on.

On the other hand, when the charge of the battery B is low and braking is applied to the vehicle, the operating conditions of the engine E, first dynamo-electric machine MG1, and second dynamo-electric machine MG2 are determined so as to increase the power generated by the first dynamo-electric machine MG1 while the rotation speed of the second dynamo-electric machine MG2 operating as a motor is suppressed. In this case, the rotation speed of the vehicle wheels W, and therefore the rotation speed of the second dynamo-electric machine MG2, decreases due to the braking applied to the vehicle. By increasing the engine rotation speed in this state, the rotation speed of the first dynamo-electric machine MG1 operating as a generator rises in accordance with the connection relationships between the gears of the planetary gear provided in the power transfer mechanism P. As a result, the power generation amount of the first dynamo-electric machine MG1 increases such that the battery B can be charged.

The required rotation speed and required torque of the engine E, which are determined by the traveling condition determining unit 12, are output to the engine control unit 13. Further, the required rotation speed and required torque of each of the first dynamo-electric machine MG1 and second dynamo-electric machine MG2 are output to the dynamo-electric machine control unit 14.

The engine control unit 13 performs operation start-up and stoppage of the engine E, and also performs operation control such as rotation speed control and output torque control on the engine E in accordance with the required rotation speed and required torque of the engine E output by the traveling condition determining unit 12.

The dynamo-electric machine control unit 14 performs operation control such as rotation speed control and torque control on the first dynamo-electric machine MG1 and second dynamo-electric machine MG2 via the inverter In in accordance with the required rotation speed and required torque of the dynamo-electric machines MG1, MG2 output by the traveling condition determining unit 12.

As shown in FIG. 3, the dynamo-electric machine control unit 14 is provided with an inverter voltage determination unit 14*a*. As described above, the required rotation speed and required torque of the dynamo-electric machines MG1, MG2 are transmitted to the dynamo-electric machine control unit 14 from the traveling condition determining unit 12. Meanwhile, the inverter In employed in this example includes the shared voltage conversion unit 4, and a direct current voltage (to be referred to as an inverter voltage Vc) subjected to voltage conversion by the shared voltage conversion unit 4 is applied to the frequency conversion unit 5. Hence, the dynamo-electric machine control unit 14 determines a frequency and a current value of each dynamo-electric machine required by the inverter In to control the dynamo-electric machines MG1, MG2 on the basis of the required rotation speed and required torque required by the dynamo-electric machines MG1, MG2, and respective direct current voltages required by the dynamo-electric machines MG1, MG2 (the voltages will be referred to respectively as a first voltage and a second voltage). Moreover, the dynamo-electric machine control unit 14 sets the higher of the determined first voltage and second voltage, which are pairly obtained, as the inverter voltage Vc. Hence, in the dynamo-electric machine control unit 14, the inverter voltage Vc, and the frequency and current value of each of the dynamo-electric machines MG1, MG2 are determined as command values relating to the inverter In and transmitted to the inverter In.

A case in which the engine E and the pair of dynamo-electric machines MG1, MG2 are operated in accordance with the traveling conditions determined by the traveling condition determining unit 12 is described above. In this embodiment, when there is a possibility that an overcurrent flows to the inverter In in this normal traveling state, the torque of the dynamo-electric machine operating as a motor is limited under a predetermined condition by the torque limiting unit 15. When the predetermined condition is satisfied, the torque of the dynamo-electric machine operating as a motor is limited to a torque limit value.

4. Torque Control System

Next, a control system by which the torque limiting unit 15 controls the torque of the dynamo-electric machine operating as a motor will be described in detail. As shown in FIG. 3, the torque limiting unit 15 includes a battery power deriving unit 15*a*, a battery power variation rate deriving unit 15*b*, a rotation speed variation rate deriving unit 15*c*, a limit power determining unit 15*d*, a torque limitation determining unit 15*e*, and a torque limit value deriving unit 15*f*.

The battery power deriving unit 15*a* derives a current battery power. Here, the battery power is the power drawn from the battery B (the power that must be supplied by the battery B) when one of the pair of dynamo-electric machines MG1, MG2 operates as a motor and the other operates as a generator in accordance with the traveling conditions (required torque and required rotation speed) determined by the traveling condition determining unit 12.

The battery power is derived as an aggregated value of a motor power (Equation 1), a generator power (Equation 2), and a boost converter loss and a capacitor charge power (Equation 4). The values are all estimated values determined in accordance with the following equations, but some (motor loss, generator loss, boost converter loss) are determined in accordance with the traveling conditions using a predetermined map or the like. These values may be determined on the basis of estimation equations that are empirically determined in advance.

$$\text{Motor torque } [W] = \text{motor required torque} \times \text{motor required rotation speed} \times 2\pi/60 + \text{motor loss: where an empirical value is used as the motor loss} \quad \text{(Equation 1)}$$

$$\text{Generator power } [W] = \text{generator required torque} \times \text{generator required rotation speed} \times 2\pi/60 + \text{generator loss: where an empirical value is used as the generator loss} \quad \text{(Equation 2)}$$

In these equations, the unit of torque is [N×m], and the unit of rotation speed is [rpm] (likewise hereafter).

The boost converter loss is a loss caused by voltage variation on either side of the converter in the voltage conversion unit 4 having the constitution described above. More specifically, loss occurs between p1 and p2 in FIG. 2. The boost converter loss is also empirically obtained, and FIG. 4 shows a relationship between the battery current [A] and the boost converter loss [W]. Hence, the boost converter loss at a given point in time can be determined on the basis of the detection value of the battery current and the map shown in FIG. 4. Alternatively, the boost converter loss at a given point in time may be determined in accordance with the following approximation (Equation 3) corresponding to the map shown in FIG. 4.

$$\text{Boost converter loss} = a1 \times (\text{battery current})^2 + a2 \times (\text{battery current}) + a3 \quad \text{(Equation 3)}$$

Note that in (Equation 3), a1, a2, a3 are predetermined constants.

The capacitor charge power is determined on the basis of the following (Equation 4), where C [F] is a capacitance of the smoothing capacitor 17 (see FIG. 2) and Δt is a time step.

$$\text{Capacitor charge power} = \{C \times (\text{boosted voltage})^2/2 - C \times (\text{previous boosted voltage})^2/2\}/\Delta t \quad \text{(Equation 4)}$$

Hence, the battery power is derived from the following (Equation 5).

$$\text{Battery power} = \text{motor power} + \text{generator power} + \text{boost converter loss} + \text{capacitor charge power} \quad \text{(Equation 5)}$$

The battery power derived by the battery power deriving unit 15*a* is output to the torque limitation determining unit 15*e*.

The battery power variation rate deriving unit 15*b* derives a battery power variation rate from an absolute value of a difference between the current battery power and a battery power of a preceding unit time step.

The rotation speed variation rate deriving unit 15*c* derives a rotation speed variation rate in relation to the dynamo-electric machine operating as a motor from an absolute value of a difference between a current rotation speed and a rotation speed of the preceding unit time step.

The battery power variation rate derived by the battery power variation rate deriving unit 15*b* and the rotation speed variation rate derived by the rotation speed variation rate deriving unit 15*c* are output to the limit power determining unit 15*d*.

The limit power determining unit 15*d* determines a limit power, which is a maximum allowable value of the battery power. In this application, the limit power determining unit 15*d* is constituted to determine the limit power variably in accordance with the battery voltage. The battery voltage is detected by the battery state detection sensor Se4, as described above. In this embodiment, the limit power determining unit 15*d* sets the smaller of a first limit power, which is set at a fixed value regardless of the battery voltage, and a second limit power, which is set such that the battery current remains smaller than a predetermined overcurrent threshold It even when the battery voltage varies, as the limit power. The first limit power is set at a power value at which damage to the switching devices 4*c*, 4*d* and 8*a* to 8*f* provided in the inverter In can be suppressed when the battery B is normal, or in other words when the open-circuit voltage (the battery voltage when the battery current is zero) of the battery B is within a predetermined normal range. The second limit power is set at a power value at which the battery current remains smaller than the overcurrent threshold It in relation to the battery voltage, even when the battery voltage varies. In this embodiment, the overcurrent threshold It is set in advance at a maximum allowable value of the current flowing to the dynamo-electric machine from the battery. More specifically, the overcurrent threshold It is set at a maximum current value at which damage to the switching devices 4*c*, 4*d* and 8*a* to 8*f* and a reduction in the durability of the battery B can be prevented. In this embodiment, the second limit power set in this manner is set on the basis of a multiplication value of the overcurrent threshold It and the battery voltage.

FIG. 5 is a view showing an example of a map used to determine the limit power according to this embodiment. The abscissa shows the battery voltage, and the ordinate shows the limit power. As is evident from the drawing, the limit power varies in accordance with the battery voltage. Here, horizontal straight lines L1, L3, L5 on the abscissa are straight lines representing the first limit power of this application, while straight lines L2, L4, L6 having an incline of a fixed magnitude are straight lines representing the second limit power of this application. The incline of the straight lines L2, L4, L6 matches the magnitude of the overcurrent threshold It of the battery current described above. Note that of these straight lines L1 to L6, L1 and L2, which are drawn using thick broken lines, respectively represent the first limit power and the second limit power in an ideal state where torque limitation is applied to the dynamo-electric machine and the battery power is limited simultaneously with the torque limitation.

However, taking into consideration variation in the battery power in a case where control is actually performed on the dynamo-electric machine, a control delay occurs due to the fact that PWM control is executed on the basis of an average output value within a calculation period. As a result, a so-called overshoot occurs whereby the battery power continues to increase between application of the torque limitation and actual limitation of the battery power. Hence, in this embodiment, as shown in the following (Equation 6) and (Equation 7), the first limit power and second limit power are set after subtracting a value (d1 and d2 in FIG. 5) corresponding to a control delay power in advance. Here, the control delay power is the increase in battery power caused by a delay in the control executed on the dynamo-electric machines MG1, MG2.

First limit power=ideal first limit power−value corresponding to control delay power (Equation 6)

Second limit power=ideal second limit power (overcurrent threshold *It*×battery voltage)−value corresponding to control delay power (Equation 7)

Hence, in this embodiment, the first limit power and second limit power are set in a manner such that, when the battery power increases by the control delay power due to a delay in the control executed on the dynamo-electric machine, the first limit power and second limit power become equal to the first limit power and second limit power in the ideal state (a value equal to the control delay power is subtracted) or smaller than the first limit power and second limit power in the ideal state (a slightly larger value than the control delay power is subtracted to be on the safe side). The control delay power is obtained as a measured value based on actual measurement. The straight lines L3 and L4 in FIG. 5 represent the first limit power and second limit power, respectively, which take into consideration the control delays of the respective dynamo-electric machines. Note that in this example, the value corresponding to the control delay power is subtracted as a fixed value regardless of the battery voltage. By setting the first limit power and second limit power after performing a correction taking into consideration the control delay power in this manner, the increase in battery power caused by the control delay can be absorbed, and therefore an overcurrent can be prevented.

Further, depending on the condition of the vehicle driving system 200 incorporated with the dynamo-electric machine control system 100, the battery power may vary rapidly or rapid variation thereof may be forecast. More specifically, when the battery power variation rate derived by the battery power variation rate deriving unit 15*b* is greater than a predetermined battery power rapid variation threshold, for example, it is acknowledged that the battery power has varied rapidly. Further, when the rotation speed variation rate derived by the rotation speed variation rate deriving unit 15*c* is greater than a predetermined rotation speed rapid variation threshold, for example, rapid variation in the battery power is forecast. When rapid variation of the battery power occurs as it is representatively exemplified above, an increase of the battery power caused by a delay in the control executed on the dynamo-electric machine is greater than a normal increase. Hence, in this embodiment, when rapid variation occurs, a rapid variation second limit power, which is obtained by subtracting a larger value (d4 in FIG. 5) than the value (d2 in FIG. 5) corresponding to the control delay power described above, is set instead of the second limit power described above. As is evident from the magnitude relationship between d2 and d4, the rapid variation second limit power takes a smaller value than the second limit power described above. The straight line L6 in FIG. 5 represents the rapid variation second limit power. By setting the rapid variation second limit power in this manner, the increase in battery power caused by the control delay can be absorbed even when it is greater than the normal increase, and therefore an overcurrent can be prevented.

Furthermore, when rapid variation occurs, a rapid variation first limit power, which is obtained by subtracting a larger value (d3 in FIG. 5) than the value (d1 in FIG. 5) corresponding to the control delay power described above, is set instead of the first limit power described above. As is evident from the magnitude relationship between d1 and d3, the rapid variation first limit power takes a smaller value than the first limit power described above. The straight line L5 in FIG. 5 represents the rapid variation first limit power. By setting the rapid variation first limit power in this manner, the increase in battery power caused by the control delay can be absorbed even when it is greater than the normal increase, similarly to the rapid variation second limit power, and therefore an overcurrent can be prevented.

As described above, the limit power determining unit 15*d* determines the limit power as the smaller of the first limit power and the second limit power. Hence, during a non-rapid variation period (when rapid variation is not acknowledged), the limit power determining unit 15*d* according to this embodiment determines the limit power as the first limit power set in accordance with the straight line L3 when the current battery voltage is higher than a predetermined battery voltage ($V_1$ in FIG. 5) defined by an intersection between the straight lines L3 and L4 representing the first limit power and second limit power, respectively, and determines the limit power as the second limit power set in accordance with the straight line L4 when the current battery voltage is lower than the predetermined battery voltage $V_1$. During rapid variation, on the other hand, the limit power determining unit 15*d* determines the limit power as the rapid variation first limit power set in accordance with the straight line L5 when the current battery voltage is higher than a predetermined battery voltage ($V_2$ in FIG. 5) defined by an intersection between the straight lines L5 and L6 representing the rapid variation first limit power and rapid variation second limit power, respectively, and determines the limit power as the rapid variation second limit power set in accordance with the straight line L6 when the current battery voltage is lower than the predetermined battery voltage $V_2$. Therefore, in actuality, the second limit power is determined such that an upper limit value thereof matches the first limit power, whereby the limit power is set such that the upper limit of the second limit power corresponds to the first limit power. Similarly, the rapid variation second limit power is determined such that an upper limit value thereof matches the rapid variation first limit power, whereby the rapid variation limit power is set such that the upper limit of the rapid variation second limit power corresponds to the rapid variation first limit power. The limit power determined by the limit power determining unit 15*d* is output to the torque limitation determining unit 15*e*.

The torque limitation determining unit 15*e* determines whether or not to perform torque limitation. When the battery power derived by the battery power deriving unit 15*a* equals or exceeds the limit power determined by the limit power determining unit 15*d*, the torque limitation determining unit 15*e* determines that torque limitation must be performed on the dynamo-electric machines MG1, MG2, and outputs a determination result to the torque limit value deriving unit 15*f*. When the battery power derived by the battery power deriving unit 15*a* is smaller than the limit power determined by the limit power determining unit 15*d*, the torque limitation determining unit 15*e* determines that torque limitation need not be performed on the dynamo-electric machines MG1, MG2. In this case, the dynamo-electric machines MG1, MG2 are controlled on the basis of the required torque and the required rotation speed.

The torque limit value deriving unit 15*f* derives a torque limit value at a present time when the torque limitation determining unit 15*e* determines that torque limitation of the dynamo-electric machines MG1, MG2 is required. The torque limit value deriving unit 15*f* derives the torque limit value on the basis of the limit power (during rapid variation, the rapid variation limit power) determined by the limit power determining unit 15*d*. More specifically, the torque limit value is determined in accordance with the following (Equation 8).

$$\text{Torque limit value } [Nm] = (\text{limit power} - \text{generator power} - \text{motor loss} - \text{boost converter loss} - \text{capacitor charge power}) / \{(2\pi/60) \times \text{motor rotation speed}\} \quad \text{(Equation 8)}$$

As described above, the rapid variation limit power is set at a smaller value than the normal limit power. Therefore, the torque limit value during rapid variation is smaller than the torque limit value under normal circumstances.

Hence, the torque limiting unit 15 limits the output torque of the dynamo-electric machines MG1, MG2 in accordance with the torque limit value derived by the torque limit value deriving unit 15*f* such that the battery power derived by the battery power deriving unit 15*a* does not exceed the limit power.

FIG. 6 is a view showing a relationship between the limit power and battery characteristics. In this drawing, the abscissa shows the battery current and the ordinate shows the battery voltage. Here, curves C1 to C6 correspond respectively to the straight lines L1 to L6 in FIG. 5. In other words, the curves C1 and C2 are curves representing the first limit power and second limit power in the ideal state, and correspond respectively to the straight lines L1 and L2 in FIG. 5. The curves C3 and C4 are curves representing the first limit power and second limit power taking into consideration a delay in the control executed on the dynamo-electric machine, and correspond respectively to the straight lines L3 and L4 in FIG. 5. The curves C5 and C6 are curves representing the rapid variation first limit power and rapid variation second limit power, and correspond respectively to the straight lines L5 and L6 in FIG. 5. FIG. 6 also shows two rightward falling straight lines indicating battery characteristics during discharge of the battery B, in other words, a relationship between the battery voltage and the battery current. Note that the upper side straight line (expressed as a normal VI characteristics) shows the battery characteristics when the battery B is normal, and the broken straight line on the lower side (expressed as an abnormal VI characteristics) shows the battery characteristics when the open-circuit voltage of the battery B has decreased due to disposal in an extremely low-temperature environment or deterioration of the battery B, for example.

As is evident from the drawing, when the battery B is normal, the battery current does not reach the overcurrent threshold It, which is the maximum allowable current value of the battery current flowing to the switching devices 4*c*, 4*d* and 8*a* to 8*f* constituting the inverter In, even if the torque limitation determination is performed on the basis of only the fixed first limit power taking into consideration a delay in the control executed on the dynamo-electric machines (represented by the curve C3). The reason for this is that at a point X in the drawing, where the battery current is smaller than the overcurrent threshold It, the battery power is equal to or greater than the first limit power, and therefore the torque of the dynamo-electric machines MG1, MG2 is limited. When the open-circuit voltage of the battery B decreases due to deterioration or the like, on the other hand, the battery power is equal to or smaller than the first limit power even in a region (a region Y in the drawing) where the battery current exceeds the overcurrent threshold It. Therefore, when the torque limitation determination is performed on the basis of only the fixed first limit value, the torque of the dynamo-electric machines MG1, MG2 is not limited. As a result, the battery current may exceed the overcurrent threshold It such that an excessive current flows to the switching devices 4*c*, 4*d* and 8*a* to 8*f* constituting the inverter In, thereby damaging the switching devices 4*c*, 4*d* and 8*a* to 8*f*. Moreover, the durability of the battery B may be deteriorated when an excessive current is drawn from the battery B.

In response to this problem, in addition to the fixed first limit power, the limit power determining unit 15*d* provided in the dynamo-electric machine control system 100 according to this embodiment sets the second limit power at which the battery current remains below the predetermined overcurrent threshold It even when the battery voltage varies, and determines the smaller of the fixed first limit power and the second limit power thus set as the limit power. In the example in FIG. 6, the limit power is determined from the curve C3 representing the first limit power taking into consideration the delay in the control executed on the dynamo-electric machines and the curve C4 representing the second limit power taking into consideration the delay in the control executed on the dynamo-electric machines. The torque limitation determination is then performed on the basis of the limit power determined in this manner. Hence, the battery power in the region Y where the battery current exceeds the overcurrent threshold It is smaller than the first limit power but larger than the second limit power, and therefore the torque of the dynamo-electric machines MG1, MG2 can be limited appropriately. As a result, the battery current can be prevented from exceeding the overcurrent threshold It, and problems such as damage to the switching devices 4*c*, 4*d* and 8*a* to 8*f* constituting the inverter In can be prevented appropriately. Moreover, a reduction in the durability of the battery B can be prevented appropriately.

5. Torque Limitation Processing Procedure

Next, a procedure of torque limitation processing executed by the dynamo-electric machine control system 100 according to this embodiment will be described. FIG. 7 is a flowchart showing a processing procedure of the torque limitation processing according to this embodiment. Under normal circumstances, the torque limitation processing shown in this drawing is repeated at predetermined time steps from the time point at which an ignition key is turned on to the time point at which the ignition key is turned off.

First, the required torque of the dynamo-electric machine operating as a generator (which may be referred to simply as the "generator" hereafter) and the dynamo-electric machine operating as a motor (which may be referred to simply as the "motor" hereafter) is obtained and the rotation speeds of the generator and motor are detected (step #01). In FIG. 7, the required torque is described as a torque command value. Further, the battery voltage is detected by the battery state detection sensor Se4 (step #02). Next, the battery power deriving unit 15*a* derives the current battery power (step #03), and the battery power variation rate deriving unit 15*b* derives the battery power variation rate (step #04). Meanwhile, the rotation speed variation rate deriving unit 15*c* derives the rotation speed variation rate of the dynamo-electric machine operating as a motor on the basis of the motor rotation speed, which is obtained successively (step #05). As a result of the processing described above, the current battery power, battery power variation rate, and rotation speed variation rate are obtained.

The limit power determining unit 15*d* determines, on the basis of the battery power variation rate and rotation speed variation rate obtained as described above, whether or not the battery power variation rate equals or exceeds a battery power rapid variation threshold and whether or not the rotation speed variation rate equals or exceeds a rotation speed rapid variation threshold (step #06). Thus, the occurrence of rapid variation is determined in terms of the variation rate. When neither of these conditions is satisfied (step #06: No), the limit power determining unit 15*d* determines the limit power as the smaller of the first limit power and the second limit power at the battery voltage detected in the step #02 (step #07). Next, the torque limitation determining unit 15*e* determines whether or not the battery power derived in the step #03 equals or exceeds the limit power determined in the step #07 (step #09). When it is determined that the battery power equals or exceeds the limit power (step #09: Yes), the torque limit value is derived by the torque limit value deriving unit 15*f* on the basis of the limit power (step #10), and motor torque limitation based on the torque limit value is executed by the torque limiting unit 15 (step #11). When it is determined that the battery power is smaller than the limit power (step #09: No), on the other hand, torque limitation is not executed (step #14). In this case, the dynamo-electric machine operating as a motor is operated at the required torque and the required rotation speed.

When one of the conditions is determined to be satisfied in the step #06 (step #06: Yes), the limit power determining unit 15*d* determines the limit power, based on the battery voltage detected in the step #02, as the smaller of the rapid variation first limit power and the rapid variation second limit power at the battery voltage thus detected (step #08). Next, the torque limitation determining unit 15*e* determines whether or not the battery power derived in the step #03 equals or exceeds the limit power determined in the step #08 (step #12). When it is determined that the battery power equals or exceeds the limit power (step #12: Yes), a rapid variation torque limit value is derived by the torque limit value deriving unit 15*f* on the basis of the limit power (step #13), and motor torque limitation based on the torque limit value is executed by the torque limiting unit 15 (step #11). When it is determined that the battery power is smaller than the limit power (step #12: No), on the other hand, torque limitation is not executed (step #14). In this case, the dynamo-electric machine operating as a motor is operated at the required torque and the required rotation speed.

Figure 8:
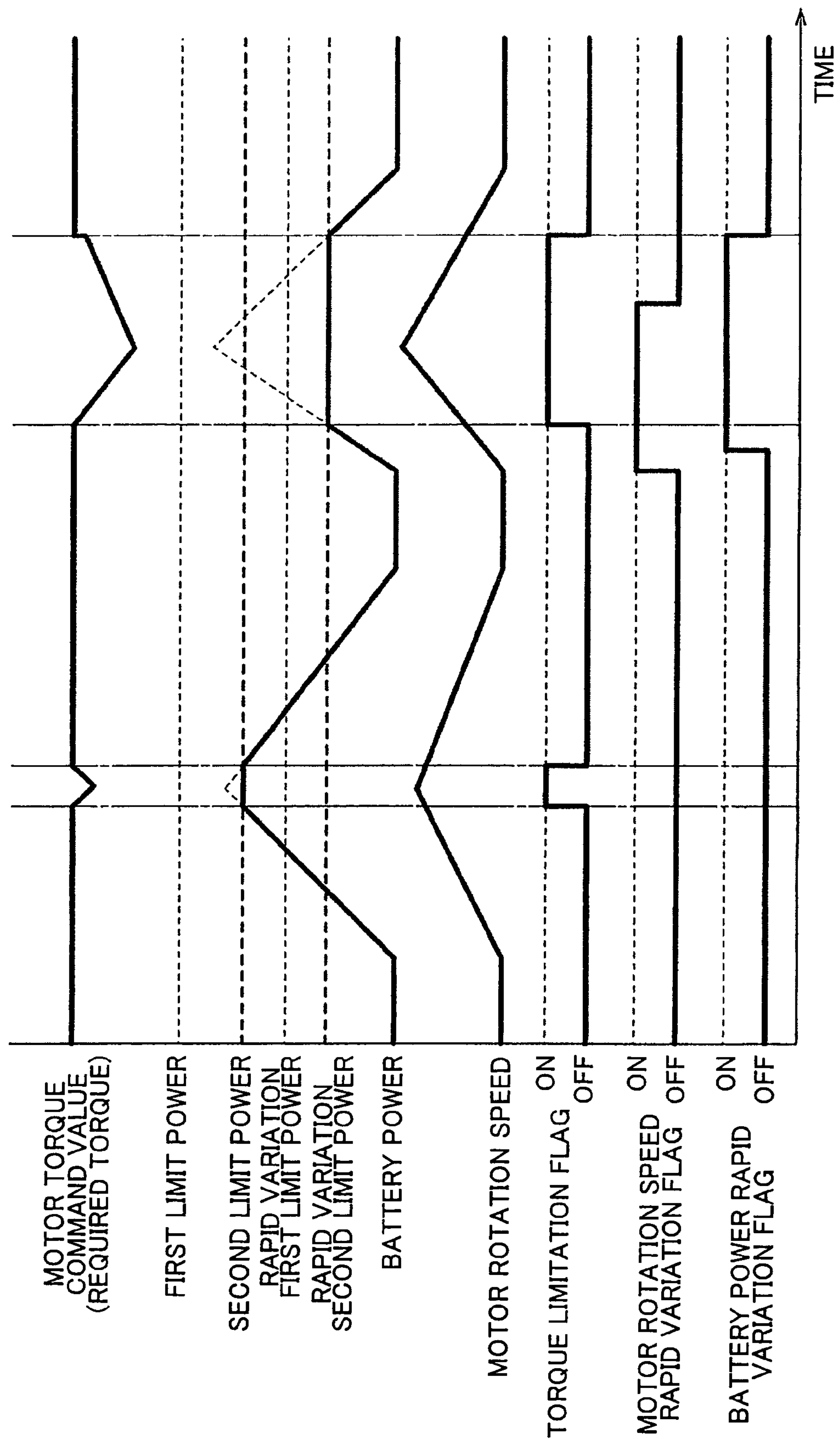
FIG. 8 is a timing chart showing torque limitation when a battery voltage is low.

Next, a case in which torque limitation is performed on the dynamo-electric machines MG1, MG2 will be described on the basis of FIGS. 8 and 9. FIG. 8 is a timing chart showing torque limitation when the battery voltage is comparatively low ($V_L$, see FIG. 5), and FIG. 9 is a timing chart showing torque limitation when the battery voltage is comparatively high ($V_N$, see FIG. 5). An example in which the open-circuit voltage of the battery B has decreased includes a case in which the battery voltage is comparatively low, and an example in which the battery B operates normally includes a case in which the battery voltage is comparatively high. In these drawings, the abscissa shows time, and the ordinate shows, in ascending order, a battery voltage rapid variation flag, a motor rotation speed rapid variation flag, a torque limitation flag, the motor rotation speed, the battery power, and the motor torque command value. Further, the first limit power, second limit power, rapid variation first limit power, and rapid variation second limit power are indicated by broken lines on the battery power chart. Note that in order to simplify a comparison between these drawings, the battery power and motor rotation speed are shown to vary in an identical manner when torque limitation is not executed. Further, the left side of each drawing shows a situation in which the battery power increases when a rapid variation is not acknowledged, while the right side shows a situation in which the battery power rises rapidly.

When the battery voltage corresponds to the comparatively low voltage $V_L$ (lower than $V_1$ and $V_2$ in the example shown in FIG. 5), the second limit power is smaller than the first limit power, as can be seen from FIG. 5, and therefore the second limit power is set as the limit power. Note, however, that when rapid variation occurs as described above, the rapid variation second limit power is smaller than the rapid variation first limit power, and therefore the rapid variation second limit power is set as the limit power. Hence, in this case, either the second limit power or the rapid variation second limit power is set as the threshold for determining whether or not to execute torque limitation. Accordingly, in FIG. 8, the broken lines indicating the second limit power and the rapid variation second limit power are drawn more thickly than the broken lines indicating the first limit power and the rapid variation first limit power.

As shown on the left side of FIG. 8, when the battery power and the motor rotation speed increase slowly and gradually, the battery power variation rate does not reach or exceed the predetermined battery power rapid variation threshold, and the rotation speed variation rate does not reach or exceed the predetermined rotation speed variation rate threshold. Therefore, the battery power rapid variation flag and the motor rotation speed rapid variation flag are not switched ON, and the need for torque limitation in relation to the battery power is determined on the basis of the second limit power. At the point where the battery power equals the second limit power, the torque limitation flag is switched ON and torque limitation is applied. When torque limitation is applied, the motor torque command value decreases gradually, but as the motor rotation speed advances in a decreasing direction, the motor torque command value varies in an increasing direction. Note that the motor torque command value corresponds to the required torque of the dynamo-electric machine operating as a motor described above. At the point where the battery power falls below the second limit power, the torque limitation flag is switched OFF, whereby torque limitation is terminated.

As shown on the right side of FIG. 8, when the battery power and the motor rotation speed increase rapidly, the battery power variation rate reaches or exceeds the predetermined battery power rapid variation threshold and the rotation speed variation rate reaches or exceeds the predetermined rotation speed rapid variation threshold. Hence, the battery power rapid variation flag and the motor rotation speed rapid variation flag are switched ON, and the need for torque limitation in relation to the battery power is determined on the basis of the rapid variation second limit power. At the point where the battery power equals the rapid variation second limit power, the torque limitation flag is switched ON and torque limitation is applied. When torque limitation is applied, the motor torque command value decreases gradually, but as the motor rotation speed advances in the decreasing direction, the motor torque command value varies in the increasing direction. At the point where the battery power falls below the rapid variation second limit power, the torque limitation flag is switched OFF, whereby torque limitation is terminated.

When the battery voltage corresponds to the comparatively low voltage $V_L$, the battery current may become excessive while securing a battery power of a fixed magnitude. According to the present invention, however, the need for torque limitation is determined on the basis of the second limit power which is smaller than the first limit power (or on the basis of the rapid variation second limit power which is smaller than the rapid variation first limit power) when the battery voltage is low, and therefore torque limitation can be executed earlier. As a result, an excessive current can be prevented from flowing to the switching devices 4*c*, 4*d* and 8*a* to 8*f* constituting the inverter In, thereby appropriately preventing problems such as damage thereto. Moreover, a situation in which an excessive current is drawn from the battery B can be prevented, thereby appropriately preventing problems such as a reduction in the durability of the battery B.

When the battery voltage corresponds to the comparatively high voltage $V_N$ (a higher voltage than $V_1$ and $V_2$ in the example in FIG. 5), on the other hand, the first limit power is smaller than the second limit power, as can be seen from FIG. 5, and therefore the first limit power is set as the limit power. Note, however, that when rapid variation occurs as described above, the rapid variation first limit power is smaller than the rapid variation second limit power, and therefore the rapid variation first limit power is set as the limit power. Hence, in this case, either the first limit power or the rapid variation first limit power is set as the threshold for determining whether or not to execute torque limitation. Accordingly, in FIG. 9, the broken lines indicating the first limit power and the rapid variation first limit power are drawn more thickly than the broken lines indicating the second limit power and the rapid variation second limit power.

As shown on the left side of FIG. 9, when the battery power and the motor rotation speed increase slowly and gradually, the battery power variation rate does not reach or exceed the predetermined battery power rapid variation threshold, and the rotation speed variation rate does not reach or exceed the predetermined rotation speed variation rate threshold. Therefore, the battery power rapid variation flag and the motor rotation speed rapid variation flag are not switched ON, and the need for torque limitation in relation to the battery power is determined on the basis of the first limit power. In the example shown in the drawing, the battery power does not reach the first limit power, and therefore the torque limitation flag is not switched ON and torque limitation is not applied.

As shown on the right side of FIG. 9, when the battery power and the motor rotation speed increase rapidly, the battery power variation rate reaches or exceeds the predetermined battery power rapid variation threshold and the rotation speed variation rate reaches or exceeds the predetermined rotation speed rapid variation threshold. Hence, the battery power rapid variation flag and the motor rotation speed rapid variation flag are switched ON, and the need for torque limitation in relation to the battery power is determined on the basis of the rapid variation first limit power. At the point where the battery power equals the rapid variation first limit power, the torque limitation flag is switched ON and torque limitation is applied. When torque limitation is applied, the motor torque command value decreases gradually, but as the motor rotation speed advances in the decreasing direction, the motor torque command value varies in the increasing direction. At the point where the battery power falls below the rapid variation first limit power, the torque limitation flag is switched OFF, whereby torque limitation is terminated.

Other Embodiments (1) In the embodiment described above, an example is described in which the limit power determining unit 15*d* sets the smaller of the first limit power, which is set at a fixed value regardless of the battery voltage, and the second limit power, which is set such that the battery current remains smaller than the overcurrent threshold It even when the battery voltage varies, as the limit power. However, the present invention is not limited to this embodiment. Specifically, the limit power may be determined on the basis of a single function as long as this function can be varied in accordance with the battery voltage and set such that the battery current remains smaller than the overcurrent threshold It even when the battery voltage varies. For example, the limit power may be determined on the basis of a function (an equation for which has been omitted) corresponding to a saturation curve that rises gently so as to approach the first limit power (the rapid variation first limit power during rapid variation) gradually.

(2) In the embodiment described above, an example in which the first limit power and second limit power are set taking into consideration the delay in the control executed on the dynamo-electric machines MG1, MG2 is described. However, the present invention is not limited to this embodiment. Specifically, for example, when a control delay does not occur or the control delay is negligible, the first limit power and second limit power may be set without taking into consideration the delay in the control executed on the dynamo-electric machines MG1, MG2.

(3) In the embodiment described above, an example is described in which a value corresponding to the control delay power is subtracted as a fixed value regardless of the battery voltage when setting the first limit power and second limit power while taking into consideration the delay in the control executed on the dynamo-electric machines MG1, MG2. However, the present invention is not limited to this embodiment. Specifically, for example, the value corresponding to the control delay may be a variable value that varies in accordance with the battery voltage. When the battery voltage varies, the control delay power varies in accordance therewith, and therefore, by subtracting a variable value that varies in accordance with the battery voltage, the first limit power and second limit power can be set with a higher degree of precision.

(4) In the embodiment described above, an example is described in which torque limitation is applied at the point where the battery power reaches or exceeds the limit power and the torque limitation is terminated at the point where the battery power falls below the limit power. However, the present invention is not limited to this embodiment. Specifically, for example, an upper side limit power used when the battery power increases and a lower side limit power used when the battery power decreases may be provided. By providing a pair of values as the limit power in this manner, hysteresis can be provided in the limit power such that a control delay can be absorbed. As a result, hunting or the like becomes less likely to occur, and therefore stable torque limitation can be realized.

(5) In the embodiment described above, an example in which the dynamo-electric machine control system 100 according to the present invention is applied to the split type hybrid driving apparatus 1 including the engine E and the pair of dynamo-electric machines MG1, MG2 is described. However, the present invention is not limited to this embodiment. Specifically, for example, the present invention may be applied to a hybrid driving apparatus having a single dynamo-electric machine. The present invention may also be applied to a driving apparatus for an electric vehicle in which only a dynamo-electric machine operating as a motor is used as a drive source.

The present invention can be used favorably in a dynamo-electric machine control system for controlling a motor and a generator, and a vehicle driving system including the dynamo-electric machine control system.

What is claimed is:

1. A dynamo-electric machine control system including a dynamo-electric machine and an inverter that is interposed between a battery and the dynamo-electric machine and that controls a current flowing through the dynamo-electric machine, wherein a rotation speed and an output torque of the dynamo-electric machine are controlled by the inverter, the dynamo-electric machine control system comprising:

a battery power deriving unit that derives a battery power to be supplied from the battery when the dynamo-electric machine is operated at the rotation speed and the output torque;

a limit power determining unit that variably determines a limit power, which is a maximum allowable value of the battery power, in accordance with a battery voltage; and a torque limiting unit that limits the torque of the dynamo-electric machine such that the battery power derived by the battery power deriving unit does not exceed the limit power, wherein the limit power determining unit determines the smaller of a first limit power, which is set at a fixed value regardless of the battery voltage, and a second limit power, which is set on the basis of a multiplication value of the battery voltage and a predetermined overcurrent threshold such that a battery current remains smaller than the predetermined overcurrent threshold even when the battery voltage varies, as the limit power.

2. The dynamo-electric machine control system according to claim 1, wherein the first limit power and the second limit power are set by subtracting in advance a value corresponding to a control delay power, which is an increase in the battery power caused by a control delay relative to the dynamo-electric machine.

3. The dynamo-electric machine control system according to claim 1, further comprising a battery power variation rate deriving unit that derives a variation rate of the battery power, wherein, during rapid variation in which the battery power variation rate derived by the battery power variation rate deriving unit is larger than a predetermined battery power rapid variation threshold, a rapid variation second limit power, which is set at a smaller value than the second limit power, is set instead of the second limit power.

4. The dynamo-electric machine control system according to claim 3, wherein, during the rapid variation, a rapid variation first limit power, which is set at a smaller value than the first limit power, is set instead of the first limit power.

5. The dynamo-electric machine control system according to claim 1, further comprising a rotation speed variation rate deriving unit that derives a variation rate in the rotation speed of the dynamo-electric machine, wherein, during rapid variation in which the rotation speed variation rate derived by the rotation speed variation rate deriving unit is larger than a predetermined rotation speed rapid variation threshold, a rapid variation second limit power, which is set at a smaller value than the second limit power, is set instead of the second limit power.

6. The dynamo-electric machine control system according to claim 5, wherein, during the rapid variation, a rapid variation first limit power, which is set at a smaller value than the first limit power, is set instead of the first limit power.

7. A vehicle driving system comprising:

the dynamo-electric machine control system according to claim 1;

a first dynamo-electric machine and a second dynamo-electric machine serving as the dynamo-electric machine; and a power transfer mechanism for distributing a driving force by a drive source other than the first dynamo-electric machine and the second dynamo-electric machine, wherein one of the driving force distributed by the power transfer mechanism is transmitted to a vehicle wheel, another one of the driving force distributed by the power transfer mechanism is transmitted to the first dynamo-electric machine, and a driving force generated by the second dynamo-electric machine is transmitted to the vehicle wheel.

8. The vehicle driving system according to claim 7, wherein the power transfer mechanism includes a planetary gear mechanism having, in order of rotation speed, a first rotary element, a second rotary element, and a third rotary element, and the first dynamo-electric machine is connected to the first rotary element, the drive source other than the dynamo-electric machine is connected to the second rotary element, and the second dynamo-electric machine and the third rotary element are connected to the vehicle wheel.

* * * * *